United States Patent [19]
Logothetis et al.

[11] Patent Number: 5,677,389
[45] Date of Patent: Oct. 14, 1997

[54] PERFLUOROELASTOMER COMPOSITION HAVING ENHANCED CURING PERFORMANCE

[75] Inventors: Anestis Leonidas Logothetis; Walter Werner Schmiegel, both of Wilmington, Del.

[73] Assignee: E. I. Du Pont de Nemours, Wilmington, Del.

[21] Appl. No.: 756,310

[22] Filed: Nov. 25, 1996

[51] Int. Cl.$^6$ ........................................ C08F 8/34
[52] U.S. Cl. .................. 525/340; 525/326.3; 525/344; 525/351; 525/359.3; 525/359.4
[58] Field of Search .................. 525/340, 344, 525/351, 359.3, 359.4

[56] References Cited

U.S. PATENT DOCUMENTS

| | | | |
|---|---|---|---|
| 3,085,083 | 4/1963 | Schreyer | 260/87.5 |
| 3,956,000 | 5/1976 | Kuhls et al. | 106/270 |
| 4,281,092 | 7/1981 | Breazeale | 526/247 |
| 4,394,489 | 7/1983 | Aufdermarsh | 525/370 |
| 4,525,539 | 6/1985 | Feiring | 525/326 |
| 4,529,784 | 7/1985 | Finlay | 525/326.3 |
| 4,713,418 | 12/1987 | Logothetis et al. | 525/200 |
| 4,879,362 | 11/1989 | Morgan | 526/247 |
| 4,983,680 | 1/1991 | Ojakaur | 525/326.3 |
| 5,051,479 | 9/1991 | Logothetis et al. | 525/197 |
| 5,260,351 | 11/1993 | Logothetis | 522/152 |
| 5,439,896 | 8/1995 | Ito et al. | 525/326.3 |
| 5,447,993 | 9/1995 | Logothetis | 525/273 |
| 5,527,861 | 6/1996 | Logothetis | 525/326.3 |
| 5,565,512 | 10/1996 | Saito et al. | 525/340 |

FOREIGN PATENT DOCUMENTS

WO95/22575  8/1995  WIPO.

Primary Examiner—Bernard Lipman

[57] ABSTRACT

Curable perfluoroelastomer compositions are provided which comprises a perfluoroelastomer, a curative, and an organic or inorganic ammonium salt which decomposes between 120°–225° C.

19 Claims, No Drawings

PERFLUOROELASTOMER COMPOSITION HAVING ENHANCED CURING PERFORMANCE

FIELD OF THE INVENTION

This invention relates to curable perfluoroelastomer compositions which have excellent processability, and which, when cured, have outstanding thermal stability and chemical resistance.

BACKGROUND OF THE INVENTION

Perfluoroelastomers (elastomeric perfluoropolymers) are polymeric materials which exhibit outstanding high temperature tolerance and chemical resistance. Consequently, such compositions are particularly adapted for use as seals and gaskets in systems in which elevated temperatures and/or corrosive chemicals are encountered. The outstanding properties of perfluoropolymers are largely attributable to the stability and inertness of the copolymerized perfluorinated monomer units which make up the major portion of the polymer backbone, e.g., tetrafluoroethylene and perfluoro(alkyl vinyl) ethers. In order to completely develop elastomeric properties, perfluoropolymers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092 and 4,394,489; and in International Application WO 95/22575.

A recently-developed class of perfluoroelastomers having carbonyl-containing functional groups is disclosed in co-pending U.S. patent application Ser. No. 08/755,919 filed Nov. 25, 1996. These polymers are characterized by having carbonyl-containing functional groups, including carboxyl groups, carboxylate groups, carboxamide groups, and mixtures thereof. Preferably, the carbonyl-containing functional groups are generated as a result of persulfate initiation of the polymerization reaction and the reaction is carried out in the absence of sulfite or bisulfite reducing agents. The carbonyl-containing perfluoroelastomers exhibit outstanding cure characteristics but they are difficult to process in certain end-uses because of their relatively high viscosity. A method for decreasing viscosity of the carbonyl-containing perfluoroelastomers by decarboxylation is disclosed in co-pending U.S. patent application Ser. No. 08/755,946 filed Nov. 25, 1996. The fully decarboxylated or partially decarboxylated perfluoroelastomers have been found to cure slowly when organotin curatives are utilized. Because perfluoroelastomers cured with organotin compounds exhibit exceptionally good high temperature performance, fast-curing compositions based on the fully or partially decarboxylated perfluoroelastomers in combination with an organotin curative would be desirable. In addition, it would also be beneficial to have a means for enhancing the cure rate of perfluoroelastomers of other types for certain end-use applications.

SUMMARY OF THE INVENTION

The present invention provides curable compositions comprising

A) a perfluoroelastomer comprising copolymerized units of 1) a perfluoroolefin, 2) a perfluorovinyl ether selected from the group consisting of perfluoro(alkyl vinyl) ethers, perfluoro(alkoxy vinyl) ethers, and mixtures thereof, and 3) a cure site monomer having at least one nitrile group, selected from the group consisting of fluorinated olefins having at least one nitrile group, fluorinated vinyl ethers having at least one nitrile group, and mixtures thereof;

B) a curative; and

C) an organic or inorganic ammonium salt which decomposes between 120° C.–225° C.

A preferred embodiment of the invention comprises a curable composition wherein the perfluoroelastomer is a perfluoroelastomer comprising copolymerized units of (1) a perfluoroolefin and (2) a perfluorovinyl ether selected from the group consisting of perfluoro(alkyl vinyl) ethers, perfluoro(alkoxy vinyl) ethers, and mixtures thereof, wherein the perfluoroelastomer is characterized by being substantially free of i) ionized or ionizable endgroups, ii) bromine-containing groups, and iii) iodine-containing groups.

A further preferred embodiment of the invention comprises a curable composition wherein the perfluoroelastorner is a perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof, and (3) a cure site monomer having at least one nitrile group, selected from the group consisting of fluorinated olefins having at least one nitrile group, fluorinated vinyl ethers having at least one nitrile group, and mixtures thereof; wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–184 $cm^{-1}$ to that within the range of 2220–2740 $cm^{-1}$, as measured on a Fourier transform infrared spectrum of the perfluoroelastomer.

Another preferred embodiment of the invention comprises a curable composition wherein the perfluoroelastomer is a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro (alkyl vinyl) ethers, perfluoro(alkoxy vinyl) ethers, and mixtures thereof; (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 1620–1840 $cm^{-1}$ to that within the range of 2220–2740 $cm^{-1}$, as measured on a Fourier transform infrared spectrum of the perfluoroelastomer.

DETAILED DESCRIPTION OF THE INVENTION

The compositions of the present invention comprise perfluoroelastomers which are characterized by enhanced cure rate. These compositions comprise three components, a) a perfluoroelastomer having copolymerized units of a cure site monomer having at least one nitrile group, b) a compound which acts as a curative for the perfluoroelastomer, and c) an organic or inorganic ammonium salt.

Perfluoroelastomers are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers are those of the formula

where $R_f$ and $R_{f'}$ are different linear or branched perfluoroalkylene groups of 2–6 carbon atoms, m and n are independently 0–10, and $R_{f''}$ is a perfluoroalkyl group of 1–6 carbon atoms.

A preferred class of perfluoro(alkyl vinyl) ethers includes compositions of the formula

where X is F or $CF_3$, n is 0–5, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluoro(alkyl vinyl) ether monomers include compounds of the formula

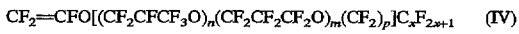

where m and n=1–10, p=0–3, and x=1–5.

Preferred members of this class include compounds where n=0–1, m=0–1, and x=1.

Examples of useful perfluoro(alkoxy vinyl) ethers include

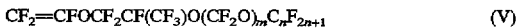

where n=1–5, m=1–3, and where, preferably, N=1.

Mixtures of perfluoro(alkyl vinyl) ethers and perfluoro(alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

The perfluoroelastomer component of the compositions of the present invention is a perfluoroelastomer of the class having copolymerized units of a nitrile-containing cure site monomer, generally in amounts of from 0.1–5 mole percent. The range is preferably between 0.4–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful cyano-substituted cure site monomers include those of the formulas shown as follows:

where n=2–12, preferably 2–6;

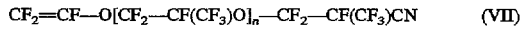

where n=0–4, preferably 0–2; and

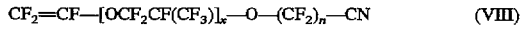

where x=1–2, and n=1–4.

Those of formula (VIII) are preferred. Especially preferred cure site monomers are perfluorinated polyethers having a nitrile group and a trifluorovinyl ether group. A most preferred cure site monomer is

i.e. perfluoro(8-cyano-5-methyl-3,6-dioxa-1-octene) or 8-CNVE.

Other cure site monomers which may additionally be copolymerized into the perfluoroelastomer backbone include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the curesite monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene.

An especially preferred perfluoroelastomer contains 53.0–79.9 mole percent tetrafluoroethylene, 20.0–46.9 mole percent perfluoro(methyl vinyl) ether and 0.4 to 1.5 mole percent nitrile-containing cure site monomer.

In preferred embodiments of the present invention, the perfluoroelastomer component is either free of ionized or ionizable polymer endgroups or it can contain ionized or ionizable polymer endgroups selected from the group consisting of carboxyl endgroups, carboxylate endgroups, or mixtures thereof.

For example, a preferred class of perfluoroelastomers comprises perfluoroelastomer compositions substantially free of a) ionized or ionizable endgroups, b) bromine-containing endgroups, and c) iodine-containing endgroups. With regard to this class of perfluoroelastomer compositions, substantially free of ionized or ionizable endgroups means that less than 5% of the polymer endgroups present are ionized or ionizable. Examples of ionized or ionizable endgroups include carboxylic acid endgroups, carboxylate endgroups, sulfonic acid endgroups, and sulfonate endgroups. By substantially free of bromine-containing endgroups and iodine-containing endgroups is meant that less than 0.01 weight percent iodine or bromine is present in the polymer endgroups. Perfluoroelastomers of this type are disclosed in co-pending U.S. patent application Ser. No. 08/755,946 filed Nov. 25, 1996.

A second preferred type of perfluoroelastomer component comprises a class of perfluoroelastomers wherein some ionized or ionizable carbonyl-containing endgroups are present. By ionized or ionizable carbonyl-containing endgroups is meant carboxylate endgroups or carboxylic acid endgroups, respectively. Preferably, no more than 80% of the endgroups will be represented by ionized or ionizable carbonyl-containing endgroups because higher levels of such endgroups are detrimental to polymer processability. These compositions are further characterized in that substantially no type of ionized or ionizable endgroup other than carbonyl-containing ionized or ionizable endgroups is present. By substantially no other type of ionized or ionizable endgroup it is meant that no more than 0.75 millimoles per kilogram of polymer of these other ionizable or ionized endgroups are present. Such other ionized or ionizable endgroups include sulfonic acid and sulfonate endgroups. If these non-carboxyl or non-carboxylate groups are present in significant quantity, then the viscosity of the polymer begins to increase, which makes polymer processing difficult. This second class of perfluoroelastomer composition may be prepared by partial decarboxylation of perfluoroelastomers having ionized or ionizable carbonyl-containing functional groups. Perfluoroelastomer compositions of this type are also disclosed in co-pending U.S. Patent Application Serial Number unknown filed as case designation DW-0005, and entitled "Perfluoroelastomer Composition Having Improved Processability," filed Nov. 25, 1996.

A third type of preferred perfluoroelastomer is disclosed in co-pending U.S. patent application Ser. No. 08/755,919 filed Nov. 25, 1996. These perfluoroelastomers have a plurality of carbonyl-containing functional groups which are present as carbonyl-containing endgroups or carbonyl-containing pendant functional groups introduced by copolymerization fluorinated carbonyl-containing comonomers. By carbonyl-containing endgroups is meant carboxylic acid endgroups, carboxylate endgroups, and carboxamide endgroups. By carbonyl-containing comonomer is meant a fluorinated monomer having a copolymerizable double bond and at least one pendant carboxylic acid group (including salts thereof), pendant carboxylic acid ester group, or pendant carboxamide group. Such comonomers are represented by compounds represented by formulas (X) and (XI):

$$CF_2=CFO(CF_2)_nX \qquad (X)$$

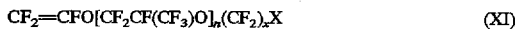
$$CF_2=CFO[CF_2CF(CF_3)O]_n(CF_2)_xX \qquad (XI)$$

where
n=1–4,
x=2–5, and
X=$CO_2H$, $CO_2^-$, $CONH_2$, or $CO_2CH_3$

Perfluoroelastomers having carboxyl or carboxylate endgroups can be prepared by polymerization of mixtures of perfluoroolefins and perfluorovinyl ethers in the presence of a free radical generating initiator either in bulk, in solution in an inert solvent, in aqueous suspension, or in aqueous emulsion. Perfluoroelastomer polymerization techniques are described in general in Logothetis, *Prog. Polymn. Sci*, Vol. 14, 252–296 (1989) and in co-pending U.S. patent application Ser. No. 08/755,919 filed Nov. 25, 1996. The Logothetis article discloses, among others, a method of polymerization involves initiation by persulfates, such as ammonium or potassium persulfate, in the absence of a reducing agent. Thermally initiated free-radical polymerization using persulfates in the absence of a reducing agent results in the production of polymers having carboxylic acid end groups which ionize to form carboxylate groups. Reducing agents include such compounds as sodium sulfite and sodium hydrogen sulfite.

As described in co-pending U.S. patent application Ser. No. 08/755,919 filed Nov. 25, 1996, carboxylated polymers having superior cure characteristics may be obtained by copolymerizing perfluoroolefins and perfluorovinyl ethers by initiating the copolymerization reaction with ammonium persulfate, in the absence of a reducing agent, in aqueous emulsion in a continuous well-stirred reactor with a residence time of 2–4 hours, at a temperature of 75° C.–90° C. and at a pressure of 2–8 MPa. Preferably the residence time is between 3.0–3.7 hours, the temperature is 80° C.–85° C., and the pressure is 6.0–8.0 MPa. If levels of reducing agent above 5 mole percent, based on ammonium persulfate, are present, then the amount of sulfonate endgroups reaches a level which has detrimental effects on processability. In addition, in order to obtain the fast cure rates typical of the compositions disclosed, the pH of the polymerization reaction mixture is generally between 3.5–7.0, preferably between 4.5–6.5. Tetrafluoroethylene and perfluoro(methyl vinyl) ether monomers are preferred and are fed by compressor. If a cure site monomer is used, it is preferably fed by liquid metering pump. This polymerization method results in production of a perfluoroelastomer copolymer composition having a significant proportion of carboxyl-containing endgroups, carboxylate-containing endgroups, carboxamide endgroups, or mixtures thereof. The number of carboxyl, carboxylate, and carboxamide groups present in the nitrile-containing perfluoroelastomers accounts for the carbonyl content and is related to the ratio of radicals generated to polymerization rate. Specifically, the ratio of the radical generation rate, calculated from persulfate thermal decomposition kinetics, to the polymerization rate provides a measure of the carbonyl content of the polymer. Thermal decomposition rates for persulfate are correlated in F. A. Bovey, et al., "Emulsion Polymerization", Interscience Publishers, New York, 1955. At 85° C., the first order decomposition rate coefficient is 0.011/minute. For a continuous stirred tank reactor at 85° C. and a residence time of 218 minutes, about 70% of persulfate fed would decompose to produce a radical flux $R_i$ (mmol/hour) of sulfate radicals equal to 1.4 times the persulfate fed (mmol/hour). Actual initiator efficiency could be significantly less than that assumed in this calculation, depending on polymer conditions and type of monomer involved. The polymerization rate $R_p$ (kg/hour) is readily measured, so that the ratio $R_i/R_p$ can be calculated for correlation with the observed carboxylate levels. Generally, for purposes of the present invention, the ratio $R_i/R_p$ should be in the range of about 10–50 mmol/kg, preferably 20–40 mmol/kg.

Carbonyl-containing functional groups may also be introduced by copolymerization of fluorinated carboxyl-containing comonomers with the principal perfluoroolefins and perfluorovinyl ether comonomers. Cure site monomers may also be copolymerized into the polymer as well. Such copolymerizations may be conducted substantially as described above. If the sole initiator is a persulfate salt, then carbonyl-containing endgroups will also result. If a reducing agent is additionally present, then the resultant copolymers will contain sulfate or sulfonate endgroups and the carboxyl or carboxylate groups will be present only as pendant functionalities.

The polymer emulsion, upon exiting the reactor, is coagulated with an aqueous solution of a multivalent metal salt, such as magnesium sulfate. The coagulated polymer is then washed with deionized water and dried at 70°–100° C. in a circulating air oven.

In order to produce the perfluoroelastomers which are substantially free of ionized or ionizable carbonyl-containing endgroups, decarboxylation of carboxylated perfluoroelastomer, such as those described above, is conveniently carried out by heat-treating the solid carboxylated perfluoroelastomers, which have been isolated and oven-dried. It is not necessary that the polymer be completely dry.

That is, the polymer may be completely or partially dried prior to the decarboxylation process. In order to effect decarboxylation, the perfluoropolymer is heated to a temperature sufficiently high, and for a sufficiently long period of time, to decarboxylate all of the endgroups and convert them to non-ionizable substituents, for example, difluoromethyl groups, trifluorovinyl groups, or carboxamide groups. This results in a lowering of polymer viscosity. Partially decarboxylated perfluoroelastomers are also useful compositions and may be prepared by heat treating the carboxylated perfluoroelastomer for shorter periods of time. Generally, a temperature of 250° C.–325° C. for a period of several minutes is sufficient to partially decarboxylate the polymer. Thus, a circulating air oven treatment of polymer crumb or sheet at temperatures of about 250°–325° C. is effective in removing a fraction or substantially all of the carbonyl-containing functional groups. Preferably, the polymer will be heated for 30 minutes at a temperature of 280°–320° C. If the temperature is below 250°, then decarboxylation is extremely slow. If the temperature is above 325° C., then the amount of cure site monomer in the polymer may be reduced by the heat treatment. At the lowest temperatures the required heating time is much longer than at the highest temperatures and typical heating times range from about 5 minutes to about 24 hours. The decarboxylation can also be performed in a heated extruder, in a compression mold, or any other conventional heated elastomer processing equipment. The appropriate time will depend on the degree of decarboxylation desked. It is readily understood by those skilled in the art that other means of increasing the internal temperature of the polymer may be used, for example exposure to microwave radiation.

The second component of the curable compositions of the present invention is a curing agent which acts to promote crosslinking of the perfluoroelastomer.

A cure system based on an organotin compound is typically utilized for curing perfluoroelastomers which have nitrile-containing copolymerized units. Suitable organolin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 phr of curing agent can be used, and 1–4 phr is satisfactory for most purposes. It is believed that the nitrile groups trimerize to form s-triazine rings in the presence of curing agents such as organolin, thereby crosslinking the perfluoroelastomer. The crosslinks are thermally stable, even at temperatures of 275° C. and above.

A preferred cure system, useful for perfluoroelastomers containing nitrile-containing curesites utilizes bis (aminophenols) of the formulas

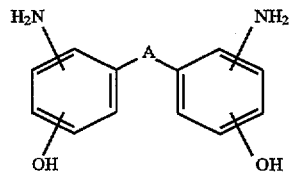 (XII)

and

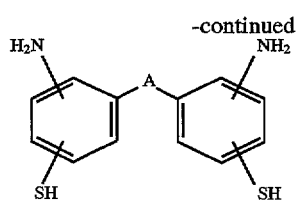 (XIII)

and tetraamines of the formula

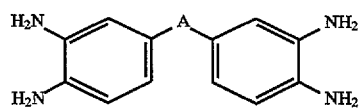 (XIV)

where A is $SO_2$, O, CO, alkyl of 1–6 carbon atoms, perfluoroalkyl of 1–10 carbon atoms, or a carbon—carbon bond linking the two aromatic rings. The amino and hydroxyl groups in formulas I and II above, are interchangeably in the meta and para positions with respect to the group A. Preferably, the curing agent is a compound selected from the group consisting of 4,4'-[2,2,2-trifluoro-1-(trifluoromethyl) -ethylidene]bis(2-aminophenol); 4,4'-sulfonylbis(2-aminophenol); 3,3'-diaminobenzidine; and 3,3',4,4'-tetraaminobenzophenone. The first of these is the most preferred and will be referred to as bis(aminophenol) AF. The curing agents can be prepared as disclosed in U.S. Pat. No. 3,332,907 to Angelo. Bis(aminophenol) AF can be prepared by nitration of 4,4'-[2,2,2-trifluoro-1-(trifluoromethyl) ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.0 parts.

Peroxides may also be utilized as curing agents. Useful peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di (tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)-butyl]carbonate. Generally, about 1–3 parts of peroxide per 100 parts of perfluoroelastomer is used. Another material which is usually blended with the composition as a part of the curative system is a coagent composed of a polyunsaturated compound which is capable of cooperating with the peroxide to provide a useful cure. These coagents can be added in an amount equal to 0.1 and 10 parts per hundred parts perfluoroelastomer, preferably between 2–5 parts per hundred parts perfluoroelastomer. The coagent may be one or more of the following compounds: triallyl cyanurate; triallyl isocyanurate; tri (methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N', N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Depending on the cure site monomers present, it is also possible to use a dual cure system. For example, perfluoroelastomers having copolymerized units of nitrile-containing cure site monomers can be cured using a curative comprising a mixture of a peroxide in combination with an organolin curative and a coagent. Generally, 0.3–5 parts of peroxide, 0.3–5 parts of coagent, and 0.1–10 parts of organotin curative are utilized.

The third component of the compositions of the present invention is a cure accelerator which is an organic or inorganic ammonium salt which decomposes at 120° to 250° C. Such accelerators can be selected from the group consisting of ammonium polyfluorocarboxylates; ammonium polyfluorosulfonates; ammonium polyfluoroalkyl group-containing phosphates, phosphonates, or sulfonates; ammonium carboxylates or sulfonates; ammonium phosphates or phosphonates; and ammonium salts of inorganic acids. The ammonium polyfluorocarboxylates are preferred. Especially preferred are ammonium perfluorooctanoate, ammonium perfluoroacetate, ammonium perfluorobutyrate, ammonium perfluorododecanoate, and ammonium perfluorohexadecanoate. Also preferred are inorganic ammonium salts, especially ammonium thiocyanate, ammonium sulfamate, ammonium dihydrogen phosphate, and ammonium thiosulfate.

The ammonium salt accelerators are generally used in amounts of from 0.05–5.0 parts per hundred parts perfluoroelastomer. Preferably, they are present in amounts of 0.3–2.0.

It has been found that the preferred decarboxylated or partially-decarboxylated perfluoroelastomers described above have an unacceptably slow cure rate when compounded in accordance with conventional organotin curative recipes unless an ammonium salt of the type described above is present in the curable composition. For example, the cure rate of a perfluoroelastomer having substantially no ionized or ionizable endgroups can be increased by as much as ten-fold or more through use of the ammonium salt accelerators. When compounded with the ammonium salt accelerators and an organotin curative, the compositions exhibit a desirable combination of low viscosity and last cure response. In addition, the cured compositions possess the excellent high temperature resistance and chemical resistance typical of perfluoroelastomer compositions.

The curable compositions of the present invention may be prepared by mixing the perfluoroelastomer, curative, and ammonium salt in conventional rubber processing equipment. Such equipment includes rubber mills, internal mixers, such as Banbury mixers, and mixing extruders.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D-1765. The particular carbon blacks useful in the compositions of the present invention are those described in WO 95/22575. These particular carbon blacks have average particle sizes of at least about 100 nm to about 500 nm as determined by ASTM D-3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, fluoropolymer fillers may also be present in the composition. Generally from 1 to 50 parts per hundred perfluoroelastomer of a fluoropolymer filler is used, and preferably at least about 5 parts of such filler per hundred parts perfluoroelastomer is present. The fluoropolymer filler can be finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the composition of the invention include, but are not limited to, those based on the group of polymers known as tetrafluoroethylene (TFE) polymers. This group includes homopolymers of TFE (PTFE) and copolymers of TFE with such small concentrations of at least one copolymerizable modifying monomer that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include both those derived from suspension polymerization and from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5-60 \times 10^3$ Pa.s, but viscosities outside this range are known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The curable compositions of the present invention are useful in production of gaskets, tubing, and seals. Such articles are produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

Test Methods

Cure Characteristics

Cure characteristics were measured using a Monsanto oscillating disk rheometer (ODR), under conditions corresponding to ASTM D 2084. The following cure parameters were recorded:

$M_{max}$: maximum torque level, in units of N.m $M_{min}$: minimum torque level, in units of N.m $M_{max}-M_{min}$ difference between maximum and minimum torque, in units of N.m $t_s2$: minutes to 2.26 Nm rise above $M_{min}$ $t_c50$: minutes to 50% of maximum torque $t_c70$: minutes to 70% of maximum torque $t_c90$: minutes to 90% of maximum torque Stress/strain properties were measured according to ASTM D-412. The following parameters were recorded:

$M_{100}$ modulus at 100% elongation in units of MPa $T_B$ tensile strength at break in units of MPa.

$E_B$ elongation at break in units of %

Compression set of O-ring samples was determined in accordance with ASTM D-395.

Example 1

Two melt blends were prepared from mixtures of a perfluoroelastomer having copolymerized units of tetrafluoroethylene (TFE), perfluoro(methyl vinyl) ether (PMVE), and perfluoro(8-cyano-5-methyl-3,6-dioxa-1-octene) (8-CNVE) and Teflon® PFA fluoropolymer resin. Blend 1 contained 100 g perfluoroelastomer and 5 g of Teflon® PFA. Blend 2 contained 100 g of the perfluoroelastomer and 10 g of Teflon® PFA. The perfluoroelastomer had been prepared by emulsion copolymerization in the presence of a free radical initiator consisting of only ammonium persulfate and in the absence of the reducing agent sodium sulfite, according to the general methods disclosed in U.S. Pat. No. 4,281,092 and contained 40.3 wt. % copolymerized units of PMVE and 3.2 wt. % copolymerized units of 8-CNVE. The resultant blends were compounded with the curatives and other components shown in Table I on a two roll high shear mill. ODR test specimens were prepared from the compounded samples and the cure response was determined. The composition which contained the ammonium salt of perfluorooctanoic acid, i.e. Sample 1, a composition of the present invention, was the only composition which could be molded into parts. O-rings formed of that composition were press-cured at 190° C. for 30 minutes and post-cured in an oven blanketed with nitrogen using a programmed temperature cycle which involves raising the temperature to 305° C. slowly and maintaining the part at 305° C. for 26 hours. Physical properties are shown in Table I. O-ring samples could not be prepared from the Comparative Sample A and Comparative Sample B compositions.

TABLE I

| Component (parts)[1] | Comparative Sample A | Comparative Sample B | Sample 1 |
|---|---|---|---|
| Blend 1 | 105 | — | 100 |
| Blend 2 | — | 110 | 105 |
| MT Carbon Black | 5 | 5 | 10 |
| Tetraphenyltin | 2 | 2 | 4 |
| Ammonium Salt[2] | — | — | 1.5 |
| ODR @ 177° C./30 minutes | | | |
| $M_{min}$ (N · m) | 0.79 | 1.13 | 0.79 |
| $M_{max}$ (N · m) | 1.24 | 1.69 | 3.22 |
| $M_{max}-M_{min}$ (N · m) | 0.45 | 0.56 | 2.43 |
| ts2 | 5.0 | 3.0 | 1.75 |
| Stress/strain Properties | | | |
| $M_{100}$ (MPa) | — | — | 6.8 |
| $T_B$ (MPa) | — | — | 9.3 |
| $E_B$ (%) | — | — | 118 |
| Compression Set[3] | — | — | 15 |

[1]Parts by weight
[2]Ammonium perfluorooctanoate
[3]204° C./70 hours

Example 2

A perfluoroelastomer (Perfluoroelastomer 2) containing copolymerized units of tetrafluoroethylene, perfluoro (methyl vinyl) ether, and perfluoro-(8-cyano-5-methyl-3,6-dioxa-1-octene) in a weight ratio of approximately 55.4/41.5/3.1 was prepared in an emulsion polymerization in the presence of an ammonium persulfate initiator, in the absence of a reducing agent, according to the general methods described in U.S. Pat. No. 4,281,092. A melt blend of the polymer with Teflon® PFA 340 fluoropolymer resin was prepared in a Werner & Pfleiderer twin screw 28 mm extruder using a high shear mixing screw. The temperature in the mixing area was 325° C. and at the die it was 300° C. A 2000 g sample of the perfluoroelastomer was granulated and mixed with 600 g of Teflon® PFA 340 fluoropolymer resin and fed into the extruder at a rate of 12 pounds/hour (5.4 kg/hour). The rate of rotation of the screw was 100 rpm and the pressure at the die was 400 psi (2.8 MPa). The extrudate was cooled by passing it through an ice water bath, residual water was removed from the extrudate by passing it over an air knife, and the dry strand was pelletized, thereby producing a partially decarboxylated perfluoroelastomer blend, designated Blend 2. The pelletized perfluoroelastomer was compounded on a high shear 2-roll mill with the components shown in Table II. The ODR cure response of Sample 2A was enhanced by addition of ammonium salt. In addition, Sample 2B, which contained a blend of 50 parks of non-decarboxylated perfluoroelastomer starring material and 65 parts of the Blend 2, exhibited a good cure response. O-rings could only be molded from Samples 2A and 2B. O-rings formed of those compositions were press-cured at 190° C. and post-cured in an oven blanketed with nitrogen using a programmed temperature cycle which involves raising the temperature to 305° C. slowly and maintaining the part at 305° C. for 42 hours. Physical properties are shown in Table II.

TABLE II

| Component (parts)[1] | Sample 2A | Sample 2B | Comparative Sample C |
|---|---|---|---|
| Blend 2 | 130 | 65 | 130 |
| Perfluoroelastomer 2 | — | 50 | — |
| MT Carbon Black | 10 | 20 | 10 |
| Tetraphenyltin | 2 | 2 | 2 |
| Ammonium Salt[2] | 1 | — | — |
| Sodium Salt[3] | — | — | 1 |
| ODR @ 177° C./30 minutes | | | |
| $M_{min}$ (N · m) | 1.58 | 2.60 | 1.41 |
| $M_{max}$ (N · m) | 5.76 | 4.75 | 2.99 |
| $M_{max}$-$M_{min}$ (N · m) | 4.18 | 2.15 | 1.58 |
| tc90 (minutes) | 10 | 15 | 23 |
| tc70 | 5 | 6.25 | 14 |
| tc50 | 4 | 3.5 | 8.5 |
| Stress/strain Properties | | | |
| $M_{100}$ (MPa) | 5.5 | 13.4 | — |
| $T_B$ (MPa) | 14.1 | 13.4 | — |
| $E_B$ (%) | 204 | 172 | — |
| Compression Set[4] | 21 | 19 | — |

[1] Parts by weight
[2] Ammonium perfluorooctanoate
[3] Sodium Perfluorooctanoate
[4] 204° C./70 hours

Example 3

An iodinated perfluoroelastomer (Perfluoroelastomer 3) was prepared according to the methods described in U.S. Pat. Nos. 4,972,038 and 4,983,697. The polymer contained copolymerized units of PMVE in an amount of 41.9 wt. %; 8-CNVE, in an amount of 2.0 wt. %; and TFE, which accounted for the remainder. The polymer contained 0.07 wt. % bound iodine, present as a result of copolymerization in the presence of $ICF_2CF(CF_3)$—O—$CF_2CF_2CN$. Perfluoroelastomer 3 was mixed with the components shown in Table III. ODR data shown in Table III illustrates the rate enhancing effect of ammonium salts on the tetraphenyltin cure of Perfluoroelastomer 3. A sample of the perfluoroelastomer composition corresponding to Sample 3A (see Table III) was molded into O-ring specimens which were press cured at 190° C. for 30 minutes, then post-cured in an oven blanketed with nitrogen using a programmed temperature cycle which involves raising the temperature to 305° C. slowly and maintaining the part at 305° C. for 26 hours. Stress/strain and compression set properties of Composition 3A are also shown in Table III. The other samples were not tested for stress/strain or compression set properties.

TABLE III

| Component (parts)[1] | Sample 3A | Sample 3B | Sample 3C | Comparative Sample D |
|---|---|---|---|---|
| Perfluoroelastomer 3 | 100 | 100 | 100 | 100 |
| MT Carbon Black | 30 | 30 | 30 | 30 |
| Tetraphenyltin | 2 | 2 | 2 | 2 |
| Ammonium Salt 1[2] | 1 | — | — | — |
| Ammonium Salt 2[3] | — | 1 | — | — |
| Ammonium Salt 3[4] | — | — | 1 | — |
| ODR @ 17.7° C. | | | | |
| $M_{min}$ (N · m) | 0.79 | 1.58 | 1.53 | 1.47 |
| $M_{max}$ (N · m) | 4.75 | 3.62 | 2.99 | 2.71 |
| $M_{max}$-$M_{min}$ (N · m) | 3.96 | 2.04 | 1.46 | 1.24 |
| ts2 (minutes) | 1.75 | 2.5 | 2.25 | 2.75 |
| Stress/strain Properties | | | | |
| $M_{100}$ (MPa) | 10.0 | — | — | — |
| $T_B$ (MPa) | 17.7 | — | — | — |
| $E_B$ (%) | 157 | — | — | — |
| Compression Set[5] | 39 | — | — | — |

[1] Parts by weight
[2] Ammonium perfluorooctanoate
[3] Ammonium sulfamate
[4] Ammonium thiocyanate
[5] 204° C./70 hours

Example 4

A perfluoroelastomer (Perfluoroelastomer 4) was prepared by continuous emulsion polymerization at 85° C. using a redox initiator system consisting of $C_6F_{13}SO_2Na$/ammonium persulfate. This initiation system is described in U.S. Pat. No. 5,285,002. The perfluoroelastomer contained copolymerized units of PMVE in an amount of 41.1 wt. %; 8-CNVE, in an amount of 3.0 wt. %; and TFE, which accounted for the remainder. The polymer had a Mooney viscosity (ML-10 @ 150° C.) of 18 and an inherent viscosity of 0.36. Perfluoroelastomer 4 was mixed with the components shown in Table IV. The accelerating effect of ammonium salts on the tetraphenyltin cure of Perfluoroelastomer 4 is illustrated by the ODR data shown in Table IV. It was impossible to mold O-ring test specimens from Comparative Sample E (see Table IV), which did not contain ammonium salt. A sample of the perfluoroelastomer composition corresponding to Sample 4A (see Table IV) was molded into O-ring specimens which were press cured at 190° C. for 30 minutes, then post-cured in an oven blanketed with nitrogen using a programmed temperature cycle which involves raising the temperature to 305° C. slowly and maintaining the part at 305° C. for 26 hours. Stress/strain and compression set properties of Sample 4A are shown in Table IV.

TABLE IV

| Component (parts)[1] | Sample 4A | Comparative Sample E |
|---|---|---|
| Perfluoroelastomer 4 | 1 | 100 |
| MT Carbon Black | 30 | 30 |
| Tetraphenyltin | 2 | 2 |
| Ammonium Salt[2] | 1 | — |
| ODR @ 177° C. | | |
| $M_{min}$ (N · m) | 0.68 | 1.13 |
| $M_{max}$ (N · m) | 4.52 | 1.58 |
| $M_{max}$-$M_{min}$ (N · m) | 3.84 | 0.45 |
| ts2 (minutes) | 2.0 | 12.5 |
| Stress/strain Properties | | |
| $M_{100}$ (MPa) | 7.3 | — |
| $T_B$ (MPa) | 14.4 | — |
| $E_B$ (%) | 180 | — |
| Compression Set[3] | 22 | — |

[1] Parts by weight
[2] Ammonium perfluorooctanoate
[3] 204° C./70 hours

Example 5

Two perfluoroelastomers (Perfluoroelastomer 5A and Perfluoroelastomer 5B) were prepared by continuous emulsion polymerization at 85° C. using an ammonium persulfate initiator, A perfluoroelastomer, 5A, containing copolymerized units of tetrafluoroethylene (TFE), perfluoro(methyl vinyl) ether (PMVE), and perfluoro-(8-cyano-5-methyl-3,6-dioxa-1-octene) (8-CNVE) was prepared as follows: An aqueous solution consisting of 20 liters of deionized water, 93 g of ammonium persulfate, 553 g of disodium hydrogen phosphate heptahydrate and 182 g of ammonium perflorooctanoate (Fluorad® FC-143 fluorinated surfactant) was pumped into a 5 L mechanically stirred, water-jacketed stainless steel autoclave at a rate of 688 ml/h. At the same time another aqueous solution consisting of 20 liters of deionized water and 177 g of ammonium perfluorooctanoate was also pumped in at a rate of 688 ml/h. A third stream consisting of 24.3 g/h of perfluoro-(8-cyano-5-methyl-3,6-dioxa-1-octene) was metered in simultaneously. By means of a diaphragm compressor a gaseous mixture of tetrafluoroethylene (363 g/h) and perfluoro(methylvinyl ether) (412 g/h) monomer was fed in at a constant rate. The temperature of the reactor was maintained at 85° C. and 6.2 MPa (900 psi) pressure throughout the reaction and the pH was controlled at 4.9 The polymer latex was removed continuously by means of a let down valve and unreacted monomers were vented. The latex from 32 hours of operation was collected and the polymer was isolated as follows: 5 liters of the above latex was added with stirring to a preheated (90°–95° C.) solution consisting of 225 g of magnesium sulfate heptahydrate and 40 liters of deionized water. The coagulated crumb polymer which resulted was filtered, washed repeatedly with water, and dried in an air oven at 70° C. for 48 hours. The dried polymer weighed 2280 g and had the following composition, 42.3 wt. % perfluoro(methyl vinyl) ether, 2.4 wt. % perfluoro(8-cyano-5-methyl-3,6-dioxa-1-octene), the remainder being tetrafluoroethylene.

Perfluoroelastomer 5B was prepared in the same manner except the 8-CNVE level was increased to 30.3 g/hour to give a polymer which contained 41.5 wt. % PMVE and 3.1 wt. % 8-CNVE; and TFE, which accounted for the remainder. The perfluoroelastomers were mixed with the components shown in Table V. The accelerating effect of ammonium salts on the diaminobisphenol cure of Perfluoroelastomers 5A and 5B is illustrated by the ODR data shown in Table V. Samples of the perfluoroelastomer compositions were molded into O-ring specimens which were press cured at 190° C. for 30 minutes, then post-cured at 305° C. for 42 hours. Stress/strain and compression set properties are shown in Table V.

TABLE V

| Component (parts)[1] | Sample 5A | Comparative Sample F | Sample 5B | Comparative Sample G |
| --- | --- | --- | --- | --- |
| Perfluoroelastomer 5A | 100 | 100 | — | — |
| Perfluoroelastomer 5B | — | — | 100 | 100 |
| MT Carbon Black | 20 | 20 | 20 | 20 |
| Diaminobisphenol AF[2] | 1 | 1 | 1 | 1 |
| Ammonium Salt[3] | 1 | — | 1 | — |
| ODR @ 177° C. | | | | |
| $M_{min}$ (N · m) | 0.79 | 1.13 | 1.13 | 1.53 |
| $M_{max}$ (N · m) | 3.50 | 3.28 | 4.41 | 2.83 |
| $M_{max}$-$M_{min}$ (N · m) | 2.71 | 2.15 | 3.28 | 1.30 |
| ts2 | 2.25 | 9.0 | 2.00 | 13.0 |
| tc50 | 6.5 | 18 | 4.75 | 20.0 |
| tc70 | 8.0 | 22.5 | 6.0 | 24.0 |
| Stress/strain Properties | | | | |
| $M_{100}$ (MPa) | 3.9 | 3.8 | 5.4 | 5.6 |
| $T_B$ (MPa) | 11.1 | 10.9 | 13.5 | 13.3 |
| $E_B$ (%) | 215 | 243 | 199 | 187 |
| Compression Set[4] | 27 | 24 | 18 | 16 |

[1]Parts by weight
[2]Ammonium perfluorooctanoate
[3]4,4'-[2,2,2-trifluoro-1-(trifluoromethyl)-ethylidene]bis(2-aminophenol)
[4]204° C./70 hours

We claim:

1. A curable composition comprising

A) a perfluoroelastomer comprising copolymerized units of 1) a perfluoroolefin, 2) a perfluorovinyl ether selected from the group consisting of perfluoro(alkyl vinyl) ethers, perfluoro(alkoxy vinyl) ethers, and mixtures thereof, and 3) a cure site monomer having at least one nitrile group, selected from the group consisting of fluorinated olefins having at least one nitrile group, fluorinated vinyl ethers having at least one nitrile group, and mixtures thereof;

B) a curative; and

C) an organic or inorganic ammonium salt which decomposes between 120° C. and 225° C.

2. A composition of claim 1 wherein the organic or inorganic ammonium salt is selected from the group consisting of ammonium polyfluorocarboxylates; ammonium polyfluorosulfonates; ammonium polyfluoroalkyl group-containing phosphates, ammonium polyfluoroalkyl phosphonates, ammonium sulfonates; ammonium carboxylates ammonium sulfonates; ammonium phosphates, ammonium phosphonates; and ammonium salts of inorganic acids.

3. A composition of claim 2 wherein the organic ammonium salt is selected from the group consisting of ammonium perfluorooctanoate, ammonium perfluoroacetate, ammonium perfluorobutyrate, ammonium perfluorododecanoate, and ammonium perfluorohexadecanoate.

4. A composition of claim 3 wherein the organic ammonium salt is ammonium perfluorooctanoate.

5. A composition of claim 2 wherein the inorganic ammonium salt is selected from the group consisting of ammonium thiocyanate, ammonium sulfamate, ammonium dihydrogen phosphate, and ammonium thiosulfate.

6. A composition as in any one of claims 1–5 wherein the perfluorovinyl ether is a perfluoro(alkyl vinyl) ether.

7. The composition as in claim 6 wherein the perfluoro (alkyl vinyl) ether is perfluoro(methyl vinyl) ether.

8. A composition as in any one of claims 1–5 wherein the perfluorovinyl ether is a perfluoro(alkoxy vinyl) ether.

9. A composition as in any one of claims 1–5 wherein the cure site monomer is a nitrile-containing fluorinated vinyl ether.

10. A composition of claim 9 wherein the nitrile-containing fluorinated vinyl ether is perfluoro(8-cyano-5-methyl-3,6-dioxa-1-octene).

11. A composition as in any one claims 1–5 wherein said curative is selected from the group consisting of compounds of the formulae

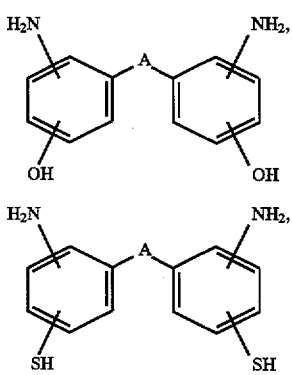

and

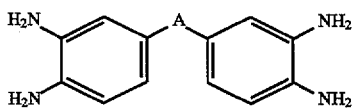

where A is $SO_2$, O, CO, alkyl of 1–6 carbon atoms, perfluoroalkyl of 1–10 carbon atoms, or a carbon—carbon bond linking the two aromatic rings.

12. The composition of claim 11 wherein said curing agent is 4,4'-[2,2,2-trifluoro-1-(trifluoromethyl)-ethylidene] bis(2-aminophenol).

13. The composition of claim 11 wherein said curing agent is 4,4'-sulfonylbis(2-aminophenol).

14. The composition of claim 11 wherein said curing agent is 3,3'-diaminobenzidine.

15. The composition of claim 11 wherein said curing agent is 3,3',4,4'-tetraaminobenzophenone.

16. The composition as in any one claims 1–5 wherein said curing agent is selected from the group consisting of organotin compounds, dialkyl peroxides, and bis(dialkyl peroxides).

17. A composition of claim 1 wherein the perfluoroelastomer is characterized by being substantially free of i) ionized or ionizable endgroups, ii) bromine-containing groups, and iii) iodine-containing groups.

18. A composition of claim 1 wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–1840 $cm^{-1}$ to that within the range of 2220–2740 $cm^{-1}$, as measured on a Fourier transform infrared spectrum of the perfluoroelastomer.

19. A curable composition comprising

A) a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 162–1840 $cm^{-1}$ to that within the range of 2220–2740 $cm^{-1}$, as measured on a Fourier transform infrared spectrum of the perfluoroelastomer.

B) a curative; and

C) an organic or inorganic ammonium salt which decomposes between 120° C. and 225° C.

* * * * *